(12) United States Patent
Kumagai et al.

(10) Patent No.: US 7,631,274 B2
(45) Date of Patent: Dec. 8, 2009

(54) INFORMATION PROCESSING APPARATUS

(75) Inventors: Akira Kumagai, Tokyo (JP); Hiroto Yoshihara, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 740 days.

(21) Appl. No.: 11/060,566

(22) Filed: Feb. 18, 2005

(65) Prior Publication Data
US 2006/0020900 A1   Jan. 26, 2006

(30) Foreign Application Priority Data
Jul. 20, 2004   (JP)   ............................ P2004-212188

(51) Int. Cl.
*G06F 3/048* (2006.01)
(52) U.S. Cl. ...................................... 715/815; 715/821
(58) Field of Classification Search ................. 715/767, 715/815, 821–823, 838
See application file for complete search history.

(56) References Cited

U.S. PATENT DOCUMENTS

| | | | | |
|---|---|---|---|---|
| 6,252,596 B1* | 6/2001 | Garland | ....................... | 715/810 |
| 6,344,865 B1* | 2/2002 | Matthews et al. | ........... | 715/815 |
| 6,538,672 B1* | 3/2003 | Dobbelaar | ................... | 715/810 |
| 6,750,888 B1* | 6/2004 | Nakagawa | ................... | 715/800 |
| 6,857,128 B1* | 2/2005 | Borden et al. | .................. | 725/39 |
| 6,934,911 B2* | 8/2005 | Salmimaa et al. | ........... | 715/744 |
| 6,943,842 B2* | 9/2005 | Stavely et al. | .......... | 348/333.05 |
| 6,966,037 B2* | 11/2005 | Fredriksson et al. | ........ | 715/830 |
| 7,017,122 B1* | 3/2006 | Lee et al. | ..................... | 715/812 |
| 7,032,188 B2* | 4/2006 | Salmimaa et al. | ........... | 715/864 |
| 7,055,104 B1* | 5/2006 | Billmaier et al. | ............ | 715/765 |
| 7,257,776 B2* | 8/2007 | Bailey et al. | ................. | 715/788 |
| 2002/0116712 A1* | 8/2002 | Schein et al. | .................. | 725/58 |

(Continued)

FOREIGN PATENT DOCUMENTS

CN   1484798 A   3/2004

(Continued)

OTHER PUBLICATIONS

First Notification issued by the Chinese Patent Office on Jul. 20, 2007, for Chinese Patent Application No. 200510007440.0, and English-language translation thereof.

(Continued)

*Primary Examiner*—William L Bashore
*Assistant Examiner*—Ashraf Zahr
(74) *Attorney, Agent, or Firm*—Finnegan, Henderson, Farabow, Garrett & Dunner, L.L.P.

(57) ABSTRACT

Any icon on a launcher screen 22 is changed from a basic-size (first-size) icon Is to a second-size icon Im one size larger than the basic-size icon Is and further a third-size icon IL further one size larger than the second-size icon Im in accordance with operation using an operation unit. The icons Is, Im and IL having different sizes are displayed with a difference in luminance from one to another. The basic-size icon Is is displayed with the darkest luminance, and the third-size icon IL is displayed with the brightest luminance. The third-size icon IL indicates the icon is an active icon. For example, when the icon is selected by operation using an "Enter" key or the like on the keyboard unit 112, execution of a function allocated to the icon is started.

24 Claims, 15 Drawing Sheets

U.S. PATENT DOCUMENTS

| | | | |
|---|---|---|---|
| 2004/0027392 A1* | 2/2004 | Dunn et al. | 345/810 |
| 2005/0154988 A1* | 7/2005 | Proehl et al. | 715/720 |
| 2005/0210410 A1* | 9/2005 | Ohwa et al. | 715/821 |
| 2007/0101364 A1* | 5/2007 | Morita | 725/38 |
| 2007/0204236 A1* | 8/2007 | Bahn et al. | 715/810 |
| 2007/0266411 A1* | 11/2007 | Yamamoto et al. | 725/88 |
| 2008/0059899 A1* | 3/2008 | Gemmell et al. | 715/767 |

FOREIGN PATENT DOCUMENTS

| | | |
|---|---|---|
| JP | 9-97154 | 4/1997 |
| JP | 09-292961 | 11/1997 |
| JP | 10-124257 | 5/1998 |
| JP | 10-289083 | 10/1998 |
| JP | 2000-116955 | 4/2000 |
| JP | 2000-148323 | 5/2000 |
| JP | 2000-276118 | 10/2000 |
| JP | 2001-076037 | 3/2001 |
| JP | 2001-109557 | 4/2001 |
| JP | 2001-216060 | 8/2001 |
| JP | 2002-163064 | 6/2002 |
| JP | 2002-210233 | 7/2002 |
| JP | 2003-32625 | 1/2003 |
| WO | WO 00/33571 | 6/2000 |

OTHER PUBLICATIONS

Notification of Reason for Refusal issued by the Japanese Patent Office on Nov. 11, 2008, for Japanese Patent Application No. 2004-212188, and English-language translation thereof.

Notification of Reason for Refusal by the Japanese Patent Office on Feb. 24, 2009, for Patent Application JP 2004-212188, and English language translation thereof.

* cited by examiner

INFORMATION PROCESSING APPARATUS

RELATED APPLICATIONS

The present disclosure relates to the subject matter contained in Japanese Patent Application No. 2004-212188 filed on Jul. 20, 2004, which is incorporated herein by reference in its entirety.

BACKGROUND OF THE INVENTION

1. Field of the Invention

The present invention relates to an information processing apparatus that displays an operation screen in which icons are arrayed, and a method and a program for controlling the operation screen.

2. Description of the Related Art

In recent years, personal computers have tended to have multifunction and high-function features. With this tendency, the personal computers have been able to be mounted with a wide variety of A/V (Audio/Visual) functions. For example, the personal computers can implement various A/V functions such as a function of viewing and recording/reproducing TV broadcast programs, a function of storing, reading and reproducing contents of movies, music, etc. using internal or external mass storage media, a function of reproducing movie and music programs provided via networks, and so on. A computer supporting such various functions needs to have a user interface function by which a user can select any desired function easily. A launcher function belongs to such a kind of user interface function. According to the launcher function, in response to selection of an icon on a screen, an application (program) allocated to the icon in advance is started up. As a technique for improving the user friendliness of the user interface function, there has been hitherto, for example, a technique of changing the shape, the display color, or the like, of an icon. One example of the above described technique is described in JP-A-2000-116955.

SUMMARY OF THE INVENTION

In a computer capable of being mounted with various functions as described above such as various A/V functions needs a user interface function by which a user can select any desired function from the various functions easily by a simple operation. However, in the related art, there is a problem in user friendliness that the screen configuration becomes complicated or the number of categories increases as the number of functions to be selected increases.

It is therefore one of objects of the present invention to provide information processing apparatus, an operation screen control method and an operation screen control program, in which a user-friendly operation function has been implemented.

According to a first aspect of the invention, there is provided an information processing apparatus including: a control unit that displays an operation screen on a display, the operation screen having a plurality of icons arrayed by category; an operation unit that operates the operation screen; an icon management unit that, when one of the icons displayed on the operation screen is pre-selected in response to an operation of the operation unit, changes size of the pre-selected icon into a first enlarged size, and displays any other icon in the category to which the pre-selected icon belongs in a state distinguishable from other icon that belongs to a different category; and an execution unit that executes a function allocated to the icon of the first enlarged size when the pre-selected icon is selected in response to an operation of the operation unit.

According to a second aspect of the invention, there is provided a method for controlling an operation screen in which a plurality of icons are arrayed, the method including: arraying a plurality of icons on the operation screen by category; and enlarging, in response to operation for pre-selecting one of the icons arrayed on the operation screen, the pre-selected icon to a first enlarged size, while displaying any other icon in the category to which the pre-selected icon belongs in a state distinguishable from other icon that belongs to a different category, and setting the icon enlarged to the first enlarged size to an active state.

According to a third aspect of the invention, there is provided a program product for causing a computer to execute procedure including: displaying an operation screen having a plurality of icons arrayed by category; and enlarging, in response to operation for pre-selecting one of the icons arrayed on the operation screen, the pre-selected icon to a first enlarged size, while displaying any other icon in the category to which the pre-selected icon belongs in a state distinguishable from other icon that belongs to a different category, and setting the icon enlarged to the first enlarged size to an active state.

BRIEF DESCRIPTION OF THE DRAWINGS

The above objects and advantages of the present invention will become more apparent by describing in detail exemplary embodiments thereof with reference to the accompanying drawings, wherein.

DETAILED DESCRIPTION OF THE PREFERRED EMBODIMENTS

Referring now to the accompanying drawings, a description will be given in detail of a preferred embodiment of the invention.

Figure 1:
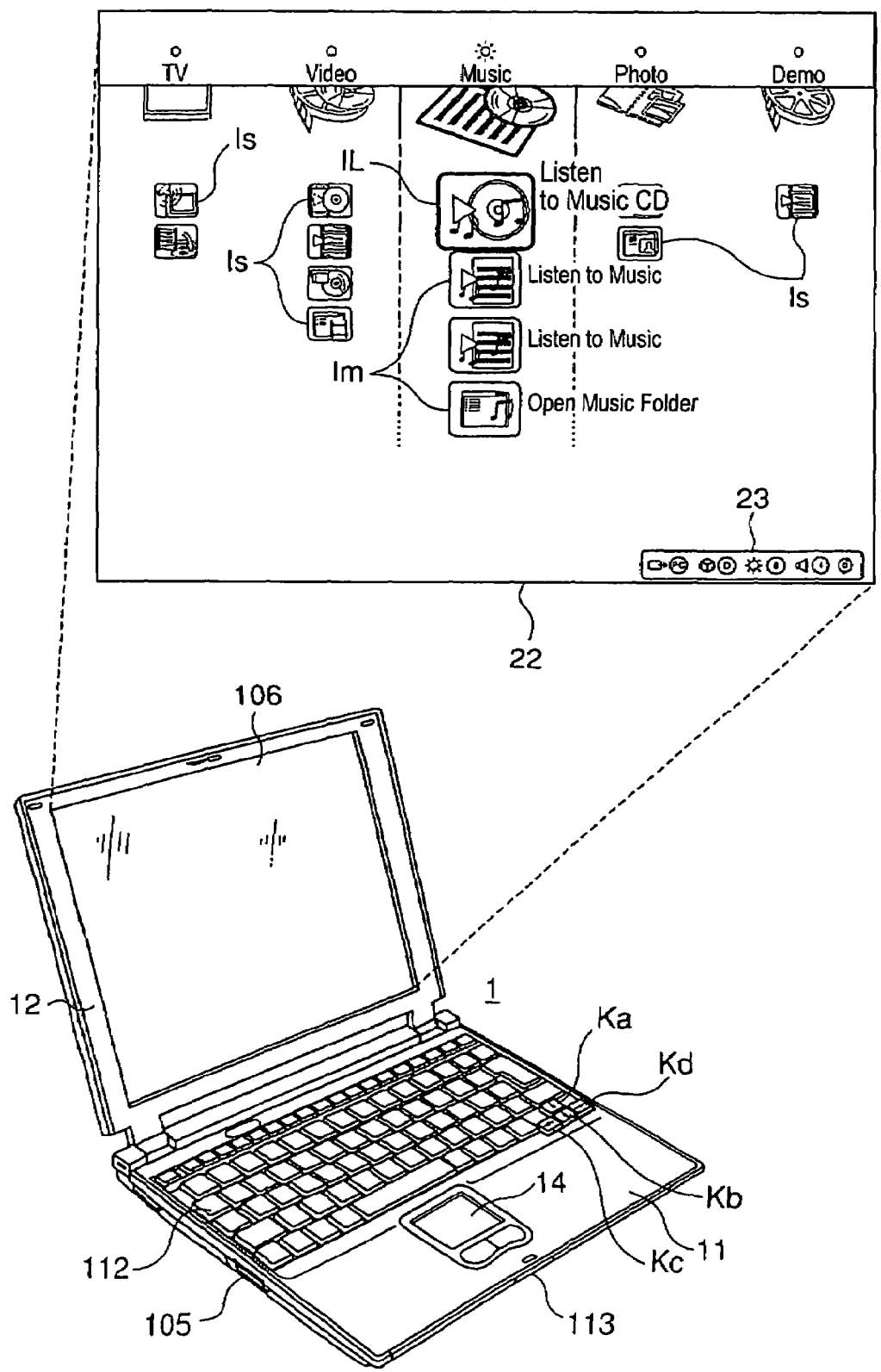
FIG. 1 is a view showing an example of the outline configuration of information processing apparatus according to an embodiment of the invention and an example of the configuration of a launcher screen.

FIG. 1 shows an example of the outline configuration of information processing apparatus having a launcher function according to an embodiment of the invention. The information processing apparatus shown in FIG. 1 is, for example, implemented as a notebook type personal computer.

As shown in FIG. 1, information processing apparatus 1 includes a body 11 and a display unit 12. The display unit 12 is attached to the body 11 so as to be rotatable between an opened position and a closed position. FIG. 1 shows the state where the display unit 12 of the information processing apparatus 1 has been opened with respect to the body 11. A display device 106 using a color LCD (Liquid Crystal Display) is incorporated in the display unit 12.

The body 11 has a substantially box-like shape. A pointing device 14, a keyboard unit 112, etc. for implementing an operation unit are disposed in the upper face of the body 11. An infrared receiving portion 113 capable of communicating with a remote controller which will be described later is provided in the front face of the body 11. A video output terminal (composite signal output terminal) 105 capable of connecting to an external television receiver is provided in one side face of the body 11. Further, though not shown, a power button for turning on/off the power of the information processing apparatus 1, a slot for inserting/extracting a medium (disk) into/from a DVD drive, etc. are provided in the body 11.

When the power button of the information processing apparatus 1 is operated to turn on the power thereof, the information processing apparatus 1 boots up an operation system (OS) to display a launcher function operation screen 22 in which icons allocated to functions are arrayed by category on a screen of the display device 106 under the control of a launcher program which will be described later. Hereinafter, the launcher function operation screen will be referred to as "launcher screen".

The operation system launches the launcher program to display the launcher screen 22 after completion of a boot process thereof. The launcher program may be automatically launched by the operation system, or be launched in accordance with an operation made by a user. The launcher screen 22 may be launched when the user presses a button provided for launching the launcher screen 22, or when the user double-clicks a program icon for launching the launcher screen 22.

In the launcher screen 22, icons allocated to functions which can be activated currently (that is, applications which has been installed and which can be activated currently) are arrayed by category. Here, in an example of arrangement by category (group), A/V functions are categorized into "TV", "video", "music", "photo" and "demo", and icons Is for selecting functions by category are disposed. For example, when each icon Is is operated (specified, or pre-selected) using arrow keys Ka, Kb, Kc and Kd provided in the keyboard unit 112 and for indicating up, down, left and right directions respectively, a mouse cursor movable in accordance with operation of the pointing device 14, or buttons (see the reference numerals 221-224 in FIG. 3) provided in a remote controller which will be described later and for indicating up, down, left and right directions respectively, all the icons belonging to the category the operated icon (located in the operated position) belongs to are set as active icon candidates. Then, the size of each active icon candidate is changed into a size (second size) one size larger than a basic size (first size). Further, the icon located in the aforementioned operated position is set as an active icon, and the size of the icon is changed into a size (third size) further one size larger than the second size. In such a manner, each icon on the launcher screen 22 is changed from an icon Is of the basic size (first size) to an icon Im of the second size larger than the first size, and further an icon IL of the third size one size larger than the second size, in accordance with operation of the operation unit. The icons Is, Im and IL having different sizes are displayed with a difference in luminance among them. Here, the basic-size (first-size) icon Is is displayed with the darkest luminance, and the third-size icon IL is displayed with the brightest luminance. The second-size icon Im is displayed with luminance between the luminance of the basic-size (first-size) icon Is and the luminance of the third-size icon IL. The third-size icon IL indicates the icon is an active icon. For example, when the icon is selected by operation of an "Enter" key on the keyboard unit 112 or the like, the function allocated to the icon is started to execute. The second-size icon Im indicates the icon is an active icon candidate. For example, the icon can be changed into an active icon (third-size icon IL) by operation using the arrow keys Ka and Kb on the keyboard unit 112 indicating the up and down directions. By operation using the arrow keys Kc and Kd on the keyboard unit 112 indicating the left and right directions, the category to be operated can be changed over. Each icon belonging to the category to be operated is set as an active icon (third-size icon IL) or an active icon candidate (second-size icon Im). Further in this embodiment, display is performed with a difference in luminance. That is, an icon array region of the category to be operated is spot-lit up so that light comes into the region from above, while any other non-active category region is dark.

A control panel 23 for controlling functions allocated to the icons on the launcher screen 22 is displayed on the display device 106 together with the launcher screen 22. In this example, the control panel 23 is provided on the launcher screen 22. However, the region of the control panel 23 may be clearly separated from the region of the launcher screen 22 so that they are displayed concurrently. Operation buttons of various operation portions which can be set currently are provided in the control panel 23. The operation portions include an operation portion for selecting a device where the video information processed internally should be output and displayed, an operation portion for setting the display of the display device 106, an operation portion for setting the sound processed internally, and so on. FIGS. 7 to 15 show specific display modes and display contents of the launcher screen 22 and the control panel 23.

Figure 2:
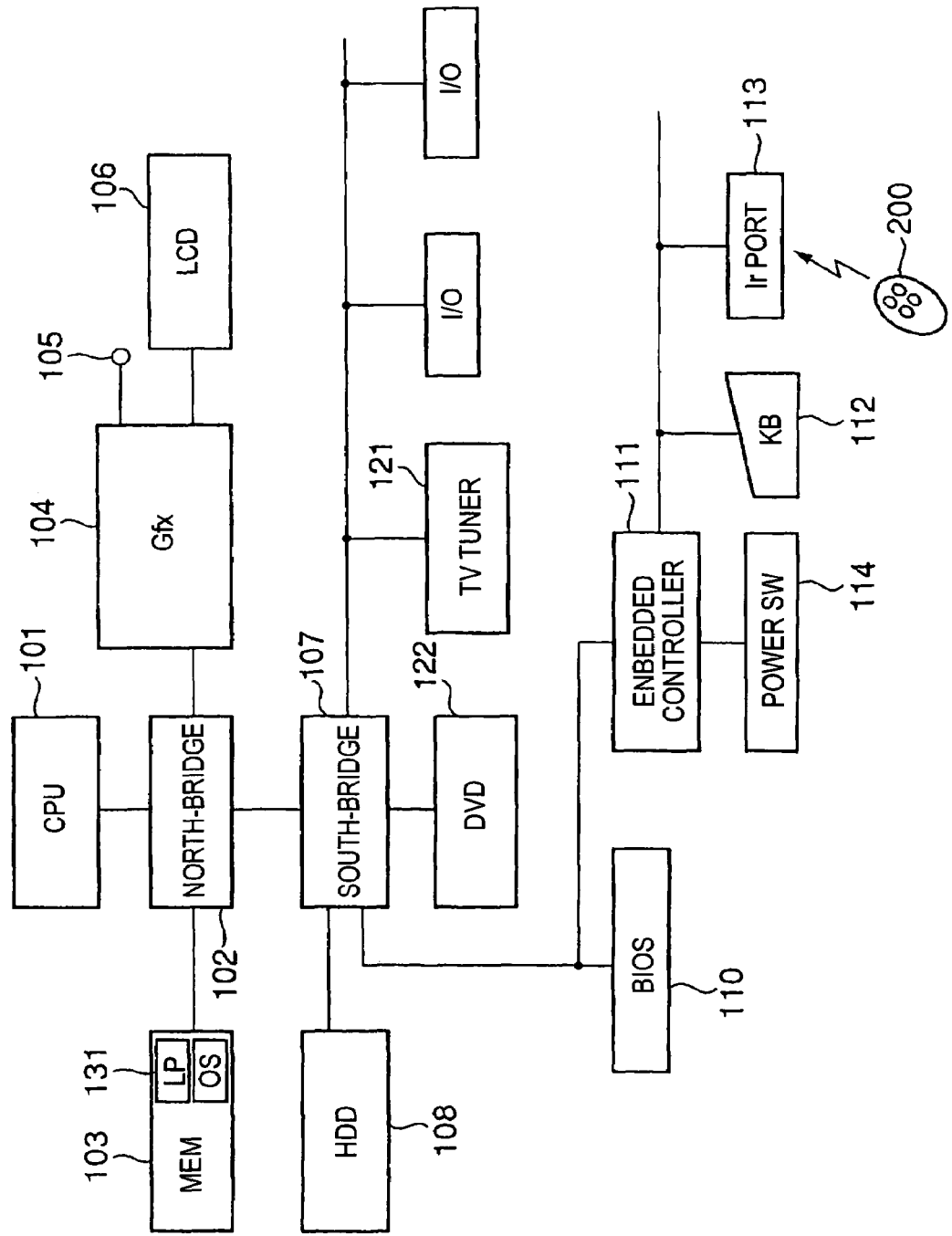
FIG. 2 is a block diagram showing an example of the system configuration of the information processing apparatus according to the embodiment.

Next, with reference to FIG. 2, description will be made about the system configuration of the information processing apparatus 1.

The information processing apparatus 1 includes various constituent parts including a CPU 101, a north bridge 102, a south bridge 107, a main memory (MEM) 103, a graphics controller (Gfx) 104, a display device (LCD) 106, a hard disk unit (HDD) 108, a BIOS-ROM 110, an embedded controller 111, a keyboard unit (KB) 112, an infrared receiving portion (Ir port) 113, a television (TV) tuner 121, a DVD player 122, etc.

The CPU 101 is a processor provided for controlling the operation of the information processing apparatus according to the embodiment. The CPU 101 executes a BIOS (Basic Input Output System) stored in the BIOS-ROM 110, and executes an operating system (OS) and various application/utility programs loaded from the hard disk unit 108 to the main memory 103. The hard disk unit 108 is an external storage device. In this embodiment, under the control of the OS, the processing of a launcher program (LP) 131 is executed in an early stage after the system is started up. The launcher program (LP) 131 is to control the display of the launcher screen 22 and the control panel 23 and to make input control in accordance with operation on the launcher screen 22 and the control panel 23. The processing function of the launcher program (LP) 131 will be described later with reference to FIGS. 4-6.

The north bridge 102 is a bridge device for connecting a local bus of the CPU 101 with the south bridge 107. The north bridge 102 includes a memory controller for controlling access to the main memory 103. In addition, the graphics controller 104 is connected to the north bridge 102.

The operating system (OS), various application programs, utility programs, etc. to be executed by the CPU 101 are stored in the main memory 103. Here, the launcher program (LP) 131 is stored in the main memory 103. The launcher program (LP) 131 has a processing procedure shown in FIGS. 4-6, and implements a launcher function using the launcher screen 22 and the control panel 23 as shown in FIG. 1 and FIGS. 7-15.

The graphics controller 104 controls data to be displayed on the display device 106. Here, under the control of the launcher program (LP) 131, the launcher screen 22 and the control panel 23 are displayed as shown in FIG. 1 and FIGS. 7-15. When "TV" is set on the control panel 23, the graphics controller 104 outputs internally processed display information to a video output terminal (composite signal output terminal) 105 instead of the display device 106.

The south bridge 107 is a bridge device connected to the north bridge 102. The hard disk unit 108, the BIOS-ROM 110, the embedded controller 111, the television (TV) tuner 121, the DVD player 122, etc. are connected to the south bridge 107.

The OS, device drivers, various application programs to be executed, including the launcher program (LP) 131, data generated by executing the application programs, etc. are stored in the hard disk unit 108. The programs and data are delivered to the main memory 103 in accordance with necessity. Further, a storage area of A/V information (contents information) is prepared in the hard disk unit 108. The BIOS to be executed by the CPU 101 is stored in the BIOS-ROM 110.

The TV tuner 121 is connected to the south bridge 107. The TV tuner 121 receives TV broadcast program data (contents) of a channel requested to view from the remote controller shown in FIG. 3 or a personal computer or the like via a LAN. The TV broadcast program data are converted into compressed and coded TV broadcast program data through a built-in NTSC decoder and a built-in MPEG encoder. When the user views the TV broadcast program data, the compressed and coded TV broadcast program data are decoded by a built-in MPEG decoder, and the decoded TV broadcast program data are displayed on the display device 106. On the other hand, when the TV broadcast program data are recorded, the TV broadcast program data compressed and coded by the MPEG encoder are stored in the hard disk unit 108.

The DVD player 122 is connected to the south bridge 107. The DVD player 122 gains read/write access onto a loaded medium (disk such as DVD or CD) so as to reproduce/record various A/V contents etc. Reproduced data of the various A/V contents are delivered to the graphics controller 104 through the bus bridge, and converted into display data in the graphics controller 104. Then, the display data are displayed on the display device 106 or output to the video output terminal (composite signal output terminal) 105.

The embedded controller 111 is a one-chip microcomputer in which an embedded controller for power management and a keyboard controller for controlling the keyboard unit 112 are integrated. The keyboard unit 112, the infrared receiving portion (Ir port) 113, the power button 114, etc. are connected to the embedded controller 111. The embedded controller 111 turns on/off the power of the information processing apparatus in accordance with user's operation on the power button 114. Further, the embedded controller 111 issues an internally processing command in accordance with a command code received by the infrared receiving portion (Ir port 113) from a remote controller 200, and delivers the command to the CPU 101 via the bus bridge.

Figure 3:
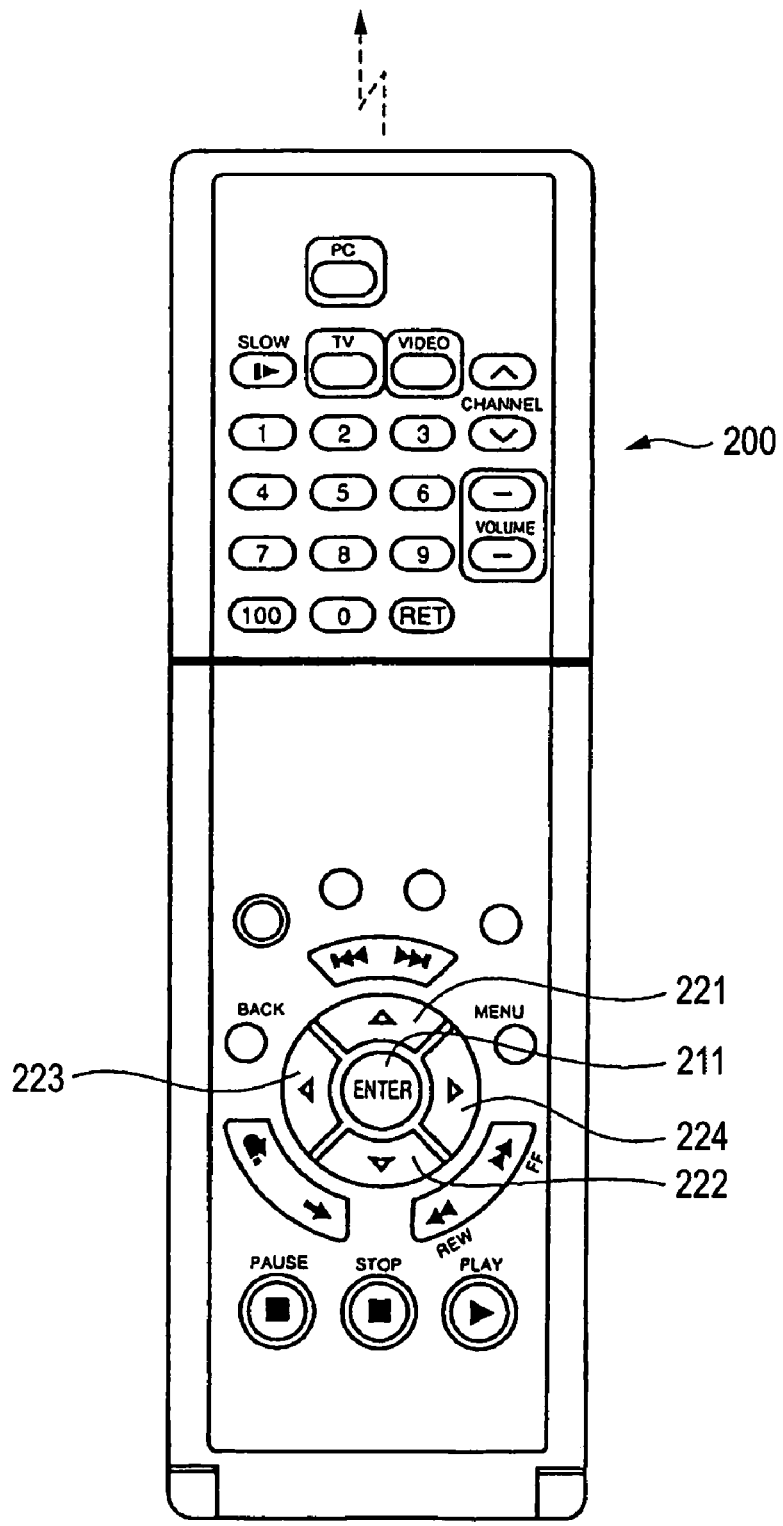
FIG. 3 is a view showing an example of the configuration of a remote controller to be applied to the information processing apparatus according to the embodiment.

FIG. 3 shows an example of the configuration of the remote controller 200. The remote controller 200 is provided with various buttons for controlling A/V functions, such as channel selection buttons for the TV tuner 121, volume buttons, etc. An "ENTER" button 211 and buttons 221-224 for indicating the up, down, left and right directions are provided as buttons related to the launcher function according to the embodiment. For example, when any icon is operated (specified, or pre-selected) using the direction indication buttons 221-224 on the launcher screen 22 shown in FIG. 1, all the icons belonging to the category the operated icon (located in the operated position) belongs to are set as active icon candidates, and the size of each active icon candidate is changed into a size (second size) one size larger than a basic size (first size). Further, the icon located in the operated position is set as an active icon, and the size of the icon is changed into a size (third size) further one size larger than the second size. When the "ENTER" button 211 is pushed down, a function (an A/V function in this case) allocated to the largest third-size icon is executed.

Figure 4:
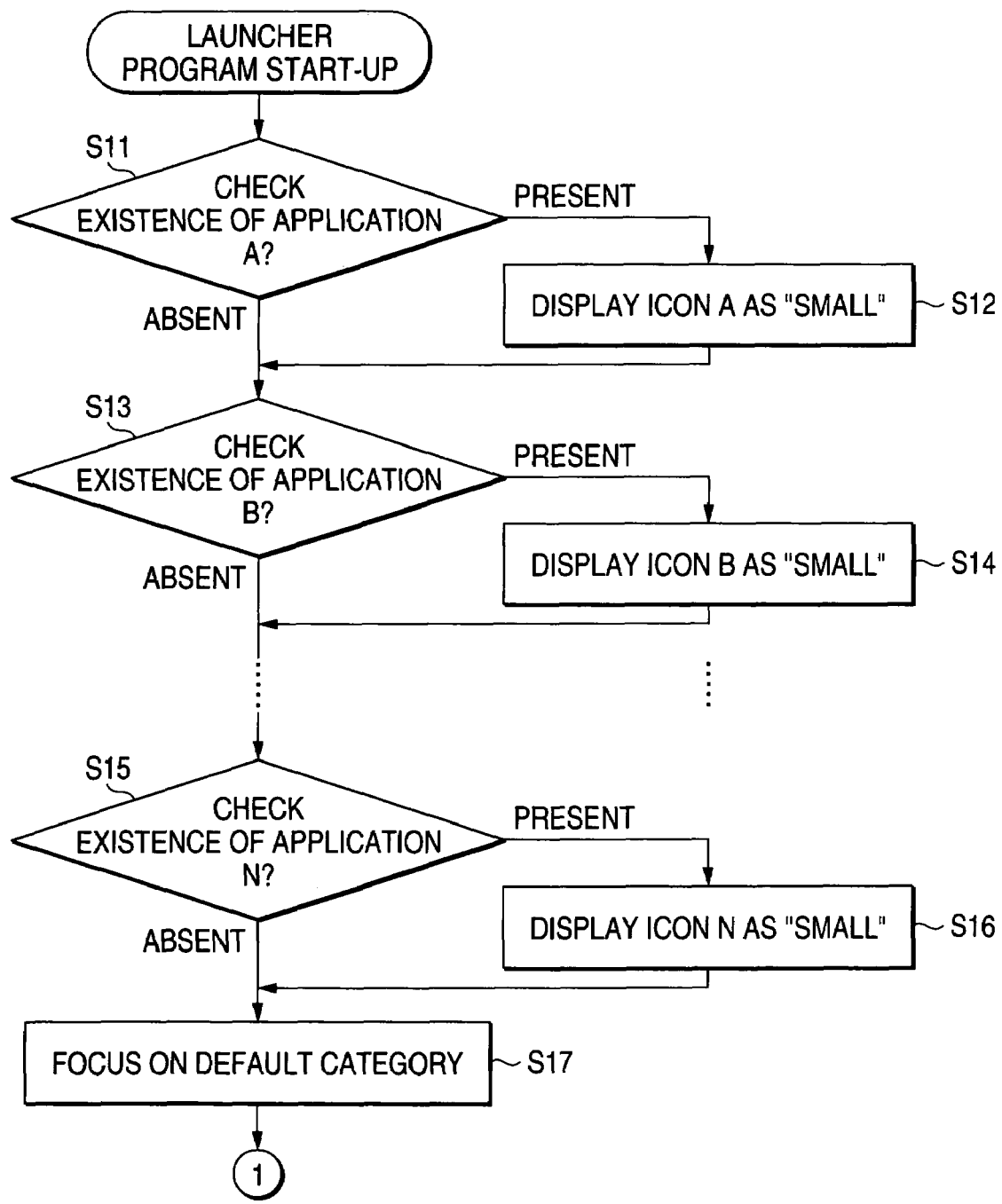
FIG. 4 is a flow chart showing the processing procedure of a launcher program according to the embodiment.
Figure 5:
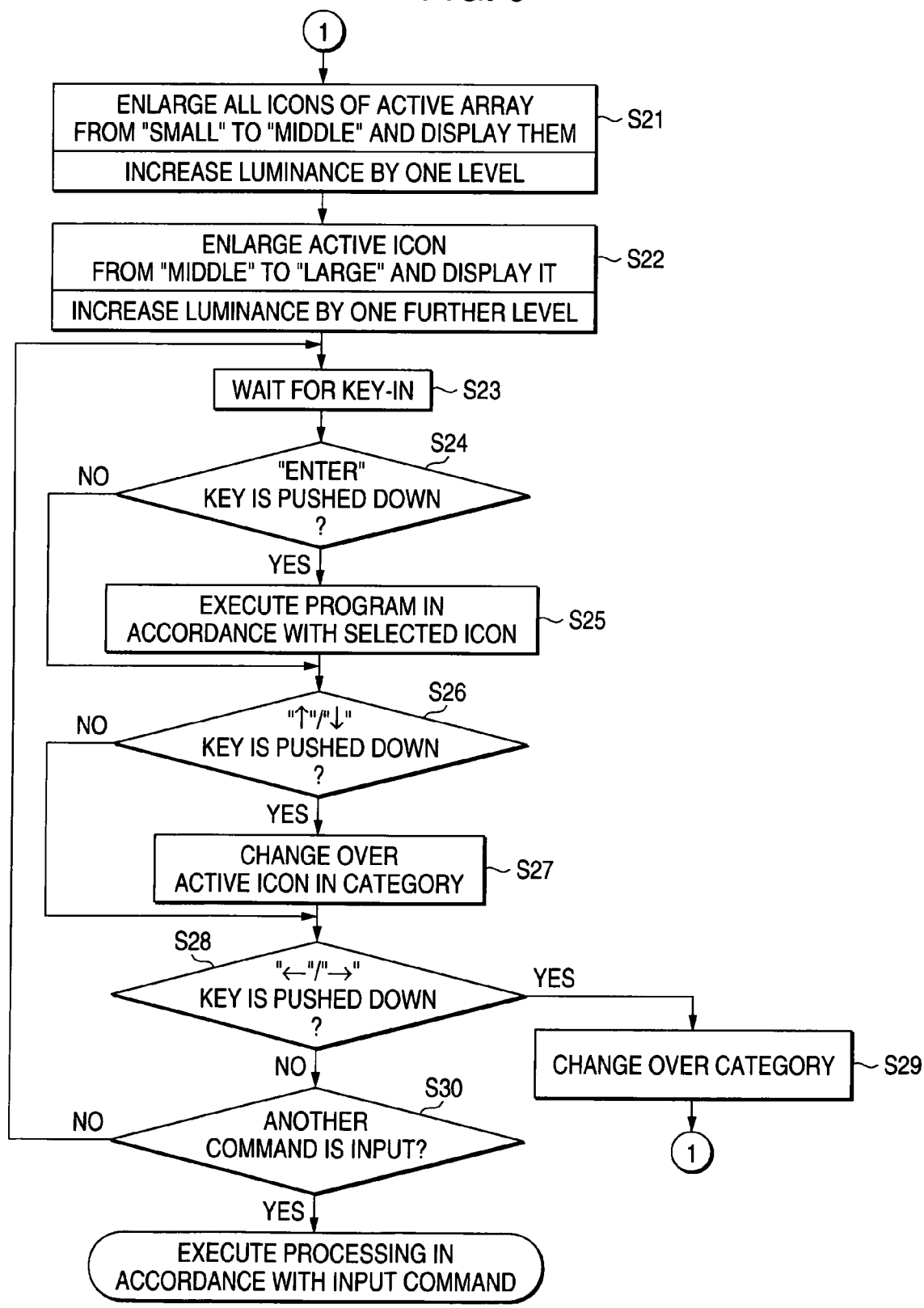
FIG. 5 is a flow chart showing the processing procedure of the launcher program according to the embodiment.
Figure 6:
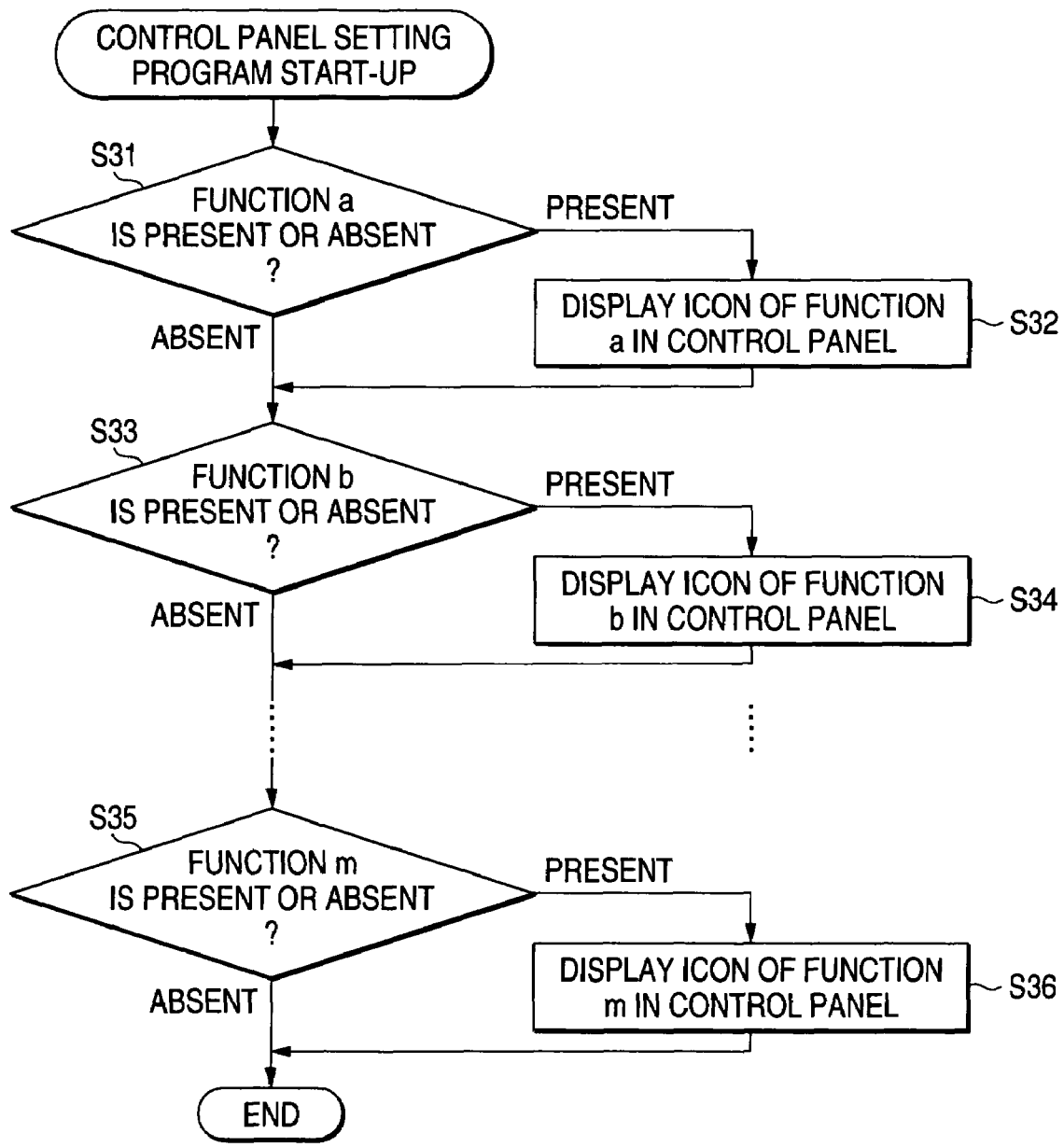
FIG. 6 is a flow chart showing the processing procedure of the launcher program according to the embodiment.

FIGS. 4-6 show the processing procedure of the launcher program (LP) 131. The launcher program (LP) 131 includes a program for setting the control panel 23, whose procedure is shown in FIG. 6. FIGS. 7-15 show specific examples of various display states of the launcher screen 22 including the control panel 23.

Here, the launcher function according to the embodiment of the invention will be described more in detail with reference to FIGS. 4-6 showing the flow charts and FIGS. 7-15 showing the specific examples of various display states of the launcher screen 22 including the control panel 23.

When the user pushes down the power button 114, the power is supplied to a group of devices constituting the system. After that, the CPU 101 executes a system start-up processing routine of the BIOS provided in the BIOS-ROM 110, so as to start up the OS. After executing an initializing processing routine, the CPU 101 loads the main memory 103 with the launcher program (LP) 131 stored in the hard disk unit 108, and executes processing of the launcher program (LP) 131.

In the processing of the launcher program (LP) 131, a display process for displaying the launcher screen 22 and the control panel 23 and an input process in accordance with screen operation thereon are executed.

In the display process for displaying the launcher screen 22, each icon prepared as a target of the launcher function in advance is checked by function (application) as to whether a function (application) allocated to the icon can operate effectively or not (Steps S11, S13, ... S15 in FIG. 4).

When it is concluded in this function check that an application for implementing the function can operate effectively, icons serving to give an instruction to execute the application are arrayed with the basic size (first size) by category (Steps S12, S14, ... S16 in FIG. 4).

Figure 7:
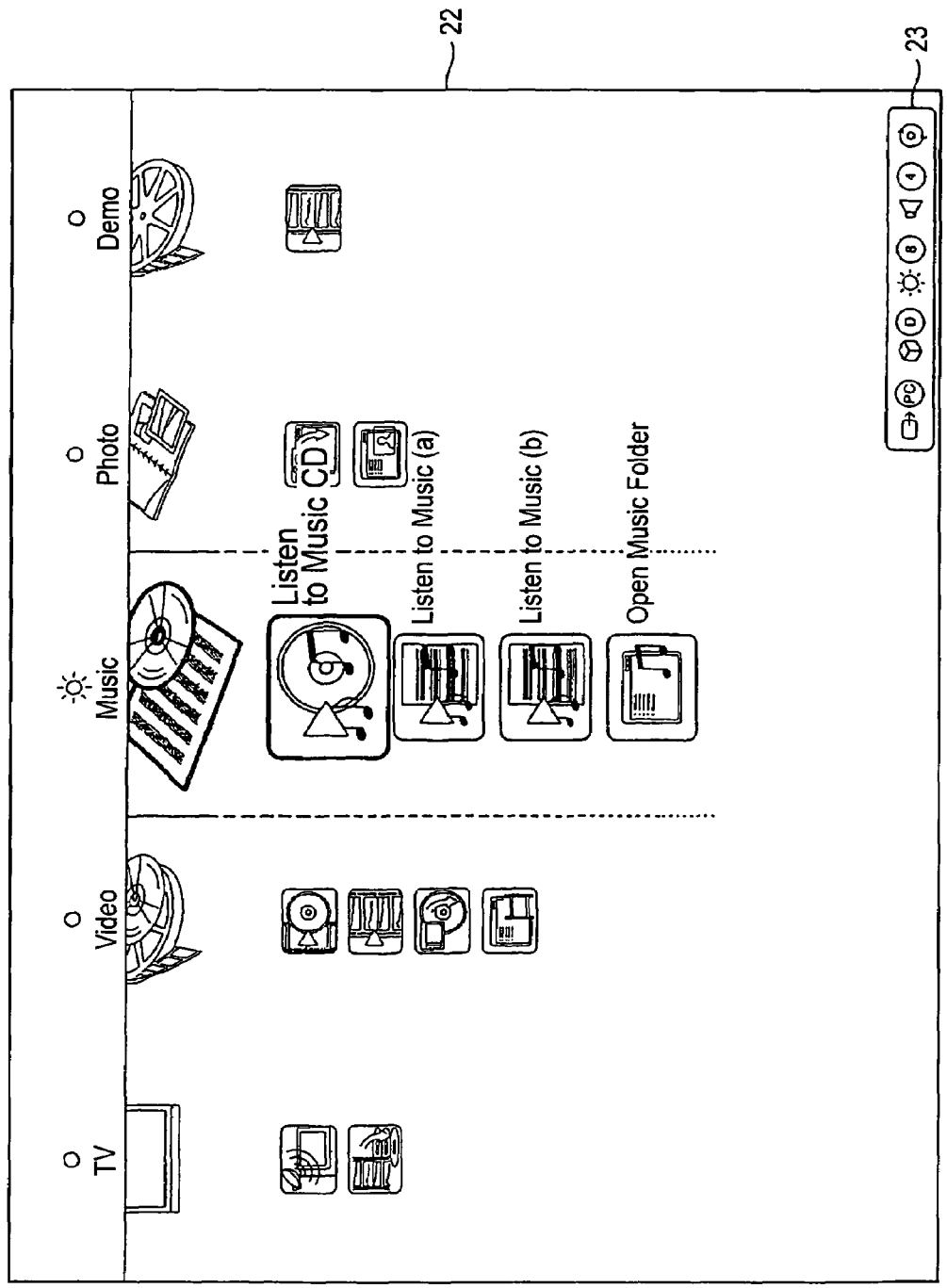
FIG. 7 is a view showing an example of display of an operation screen according to the embodiment.
Figure 8:
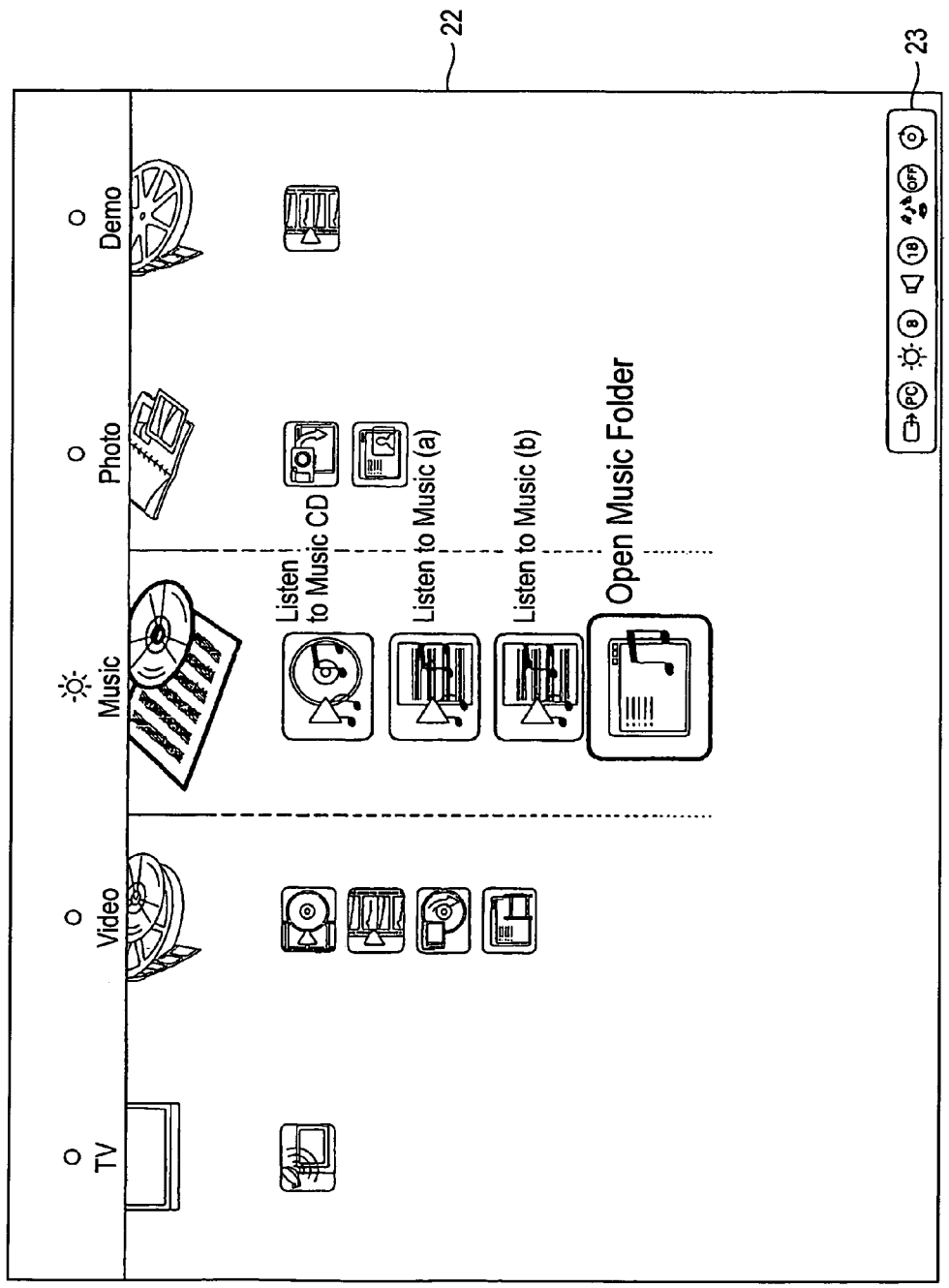
FIG. 8 is a view showing an example of display of the operation screen according to the embodiment.
Figure 9:
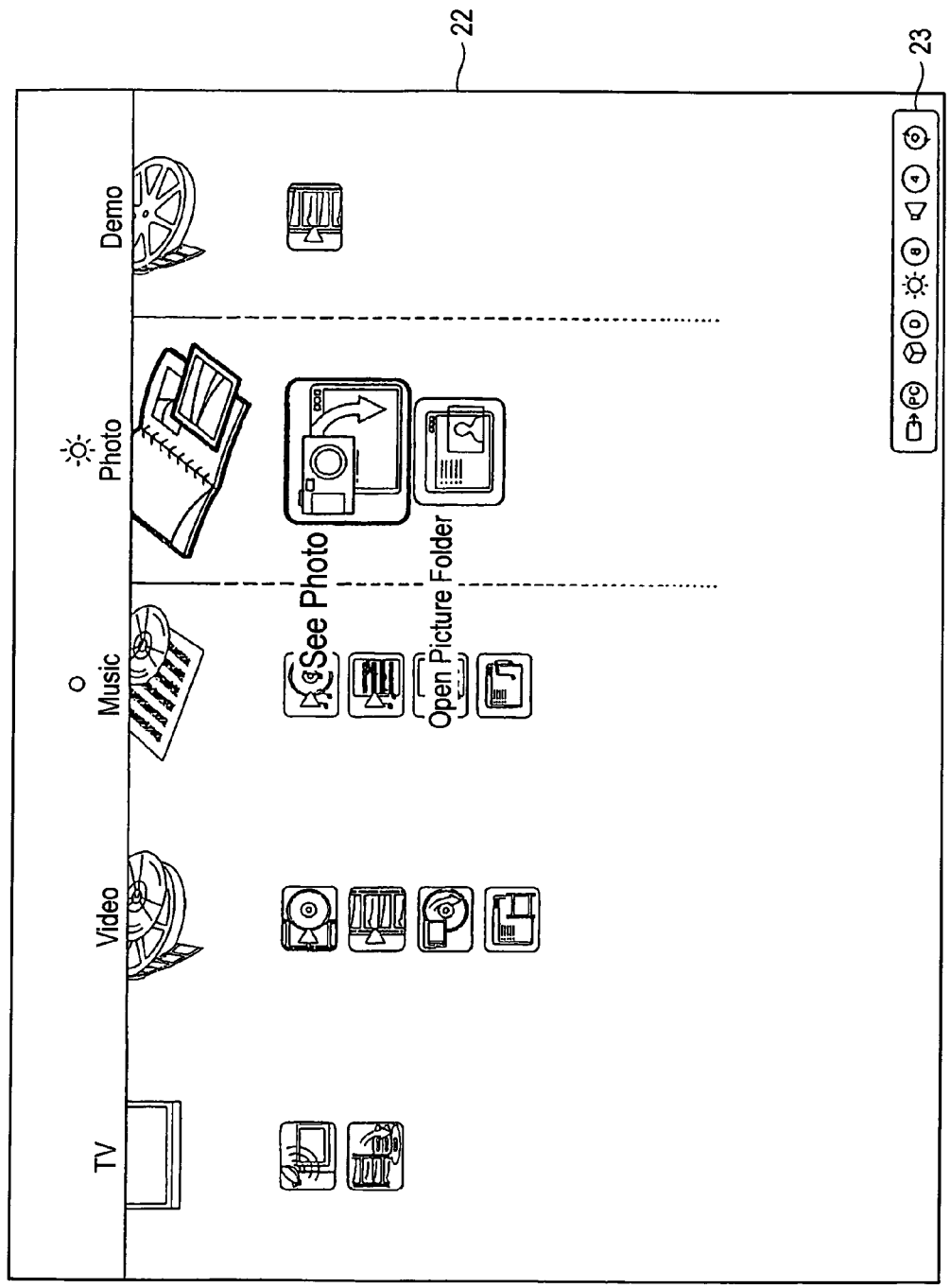
FIG. 9 is a view showing an example of display of the operation screen according to the embodiment.

The A/V functions are classified into categories "TV", "video", "music", "photo" and "demo". An icon array region is set for each of the categories, and icons for selecting functions are arranged in the region. FIGS. 7 and 8 show an example of arrangement of icons of the basic size excluding the category "music" and arranged on the launcher screen 22 in this case. FIG. 9 shows an example of arrangement of icons of the basic size excluding the category "photo". A plurality of applications having one and the same function are on the launcher screen 22. When each application can be executed, an icon proper to the application is placed. For example, as shown in FIGS. 7 and 8, icons for executing a function "listen to music" are placed in the category "music" correspondingly to executable applications respectively. In FIGS. 7 and 8, two "listen to music" function icons for an application a and an application b are placed in the category "music".

In such a manner, all the functions (applications) in each category are checked, and icons are placed in each category. After the process of checking and disposing, a process for focusing on a predetermined category (default category) is carried out (Step S17 in FIG. 4). In this process, display is performed with a difference in luminance. That is, an icon array region of the default category is spot-lit up so that light comes into the region from above, while any other category region is dark. Further, the size of each icon belonging to the default category is changed into the second size one size larger than the basic size (first size) (Step S21 in FIG. 5), and the size of a predetermined icon (default icon) belonging to the default category is changed into the third size further one size larger than the second size (Step S22 in FIG. 5). With the enlarged display of this icon, a difference in luminance is provided for each icon in accordance with the size of the icon. That is, first-size icons are made the darkest, and the third-size icon is made the brightest. FIG. 7 shows an example of the default display state of the launcher screen 22 in this time.

Figure 11:
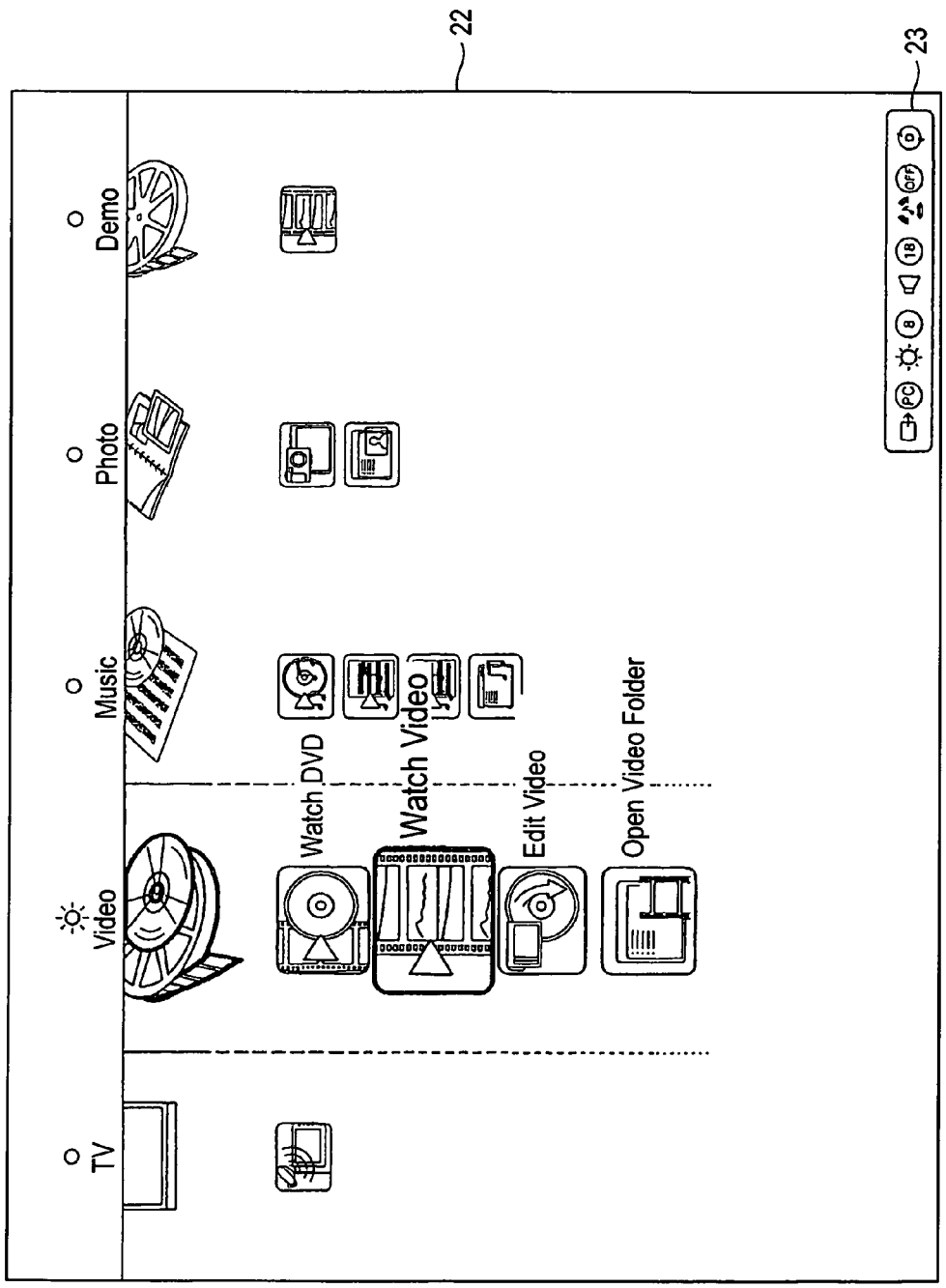
FIG. 11 is a view showing an example of display of the operation screen according to the embodiment.
Figure 12:
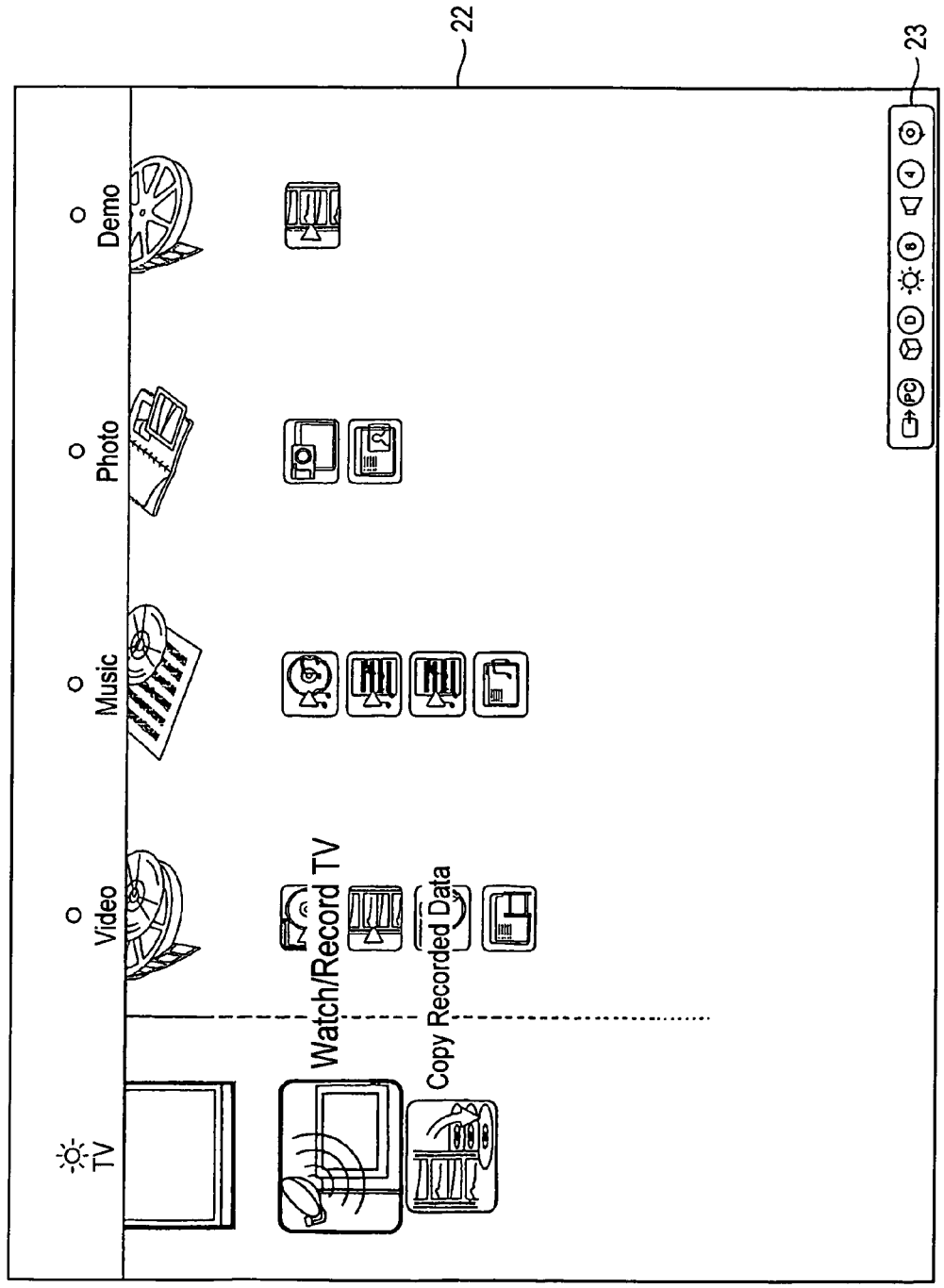
FIG. 12 is a view showing an example of display of the operation screen according to the embodiment.
Figure 13:
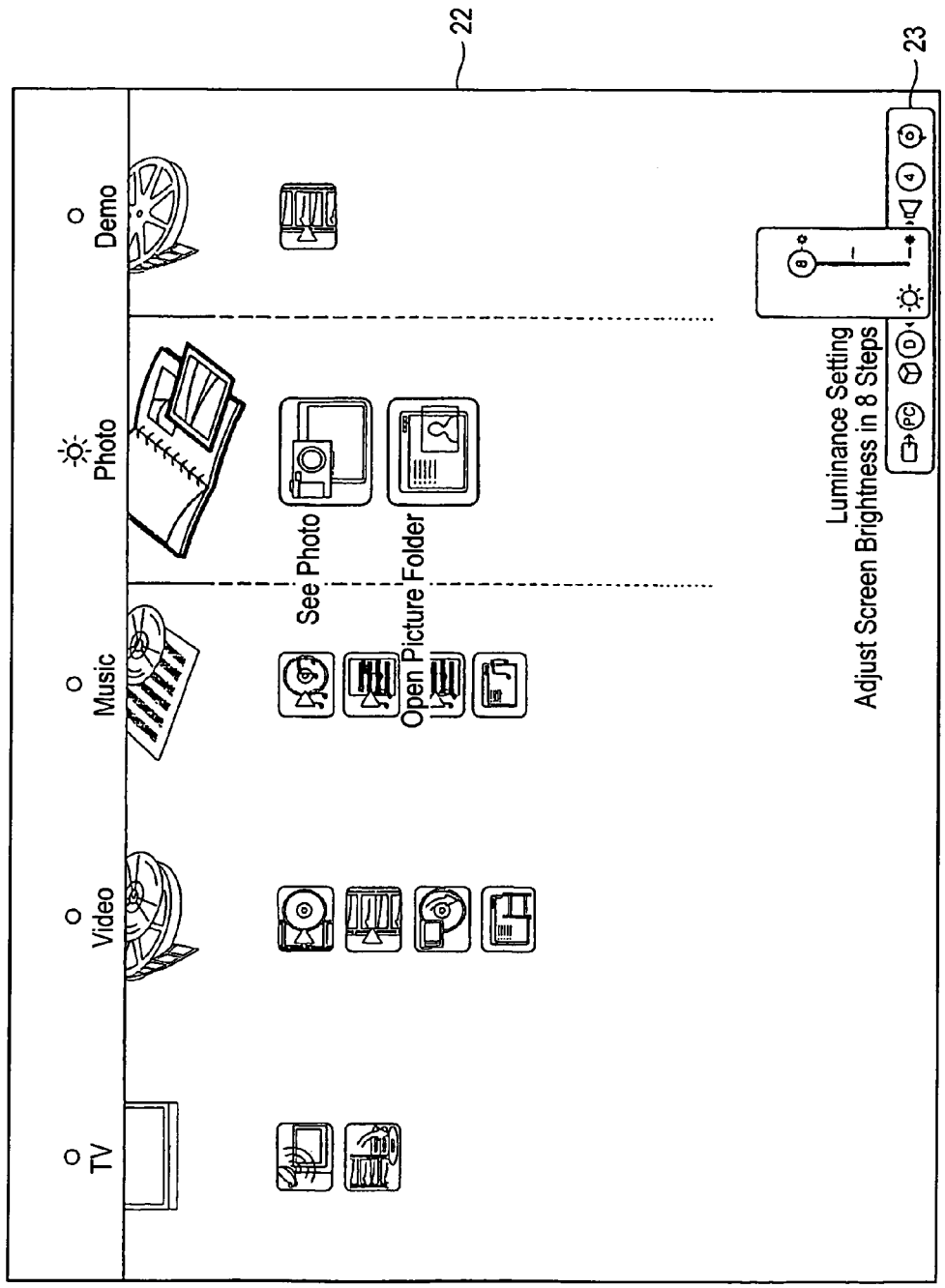
FIG. 13 is a view showing an example of display of a control panel according to the embodiment.
Figure 14:
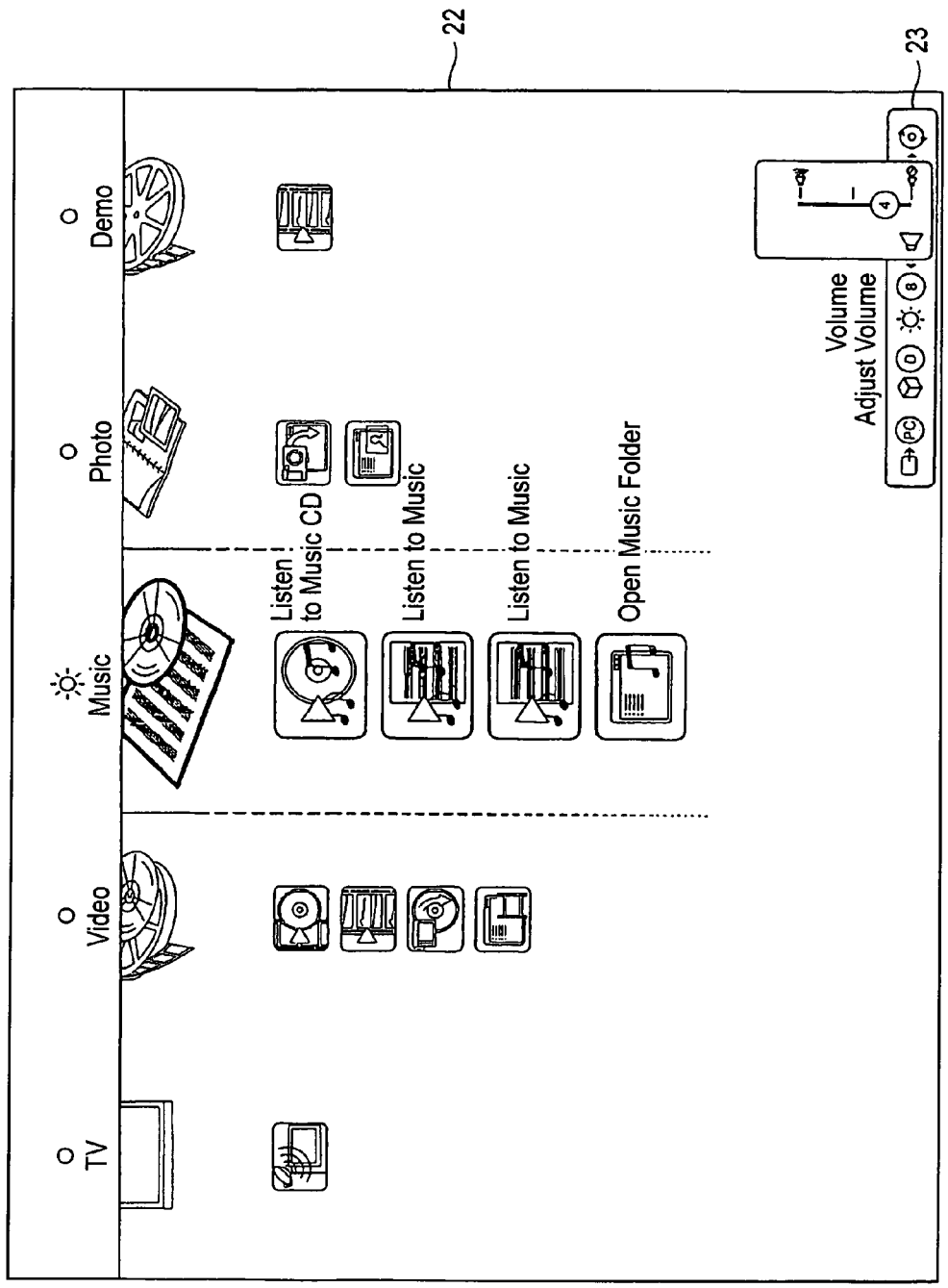
FIG. 14 is a view showing an example of display of the control panel according to the embodiment.
Figure 15:
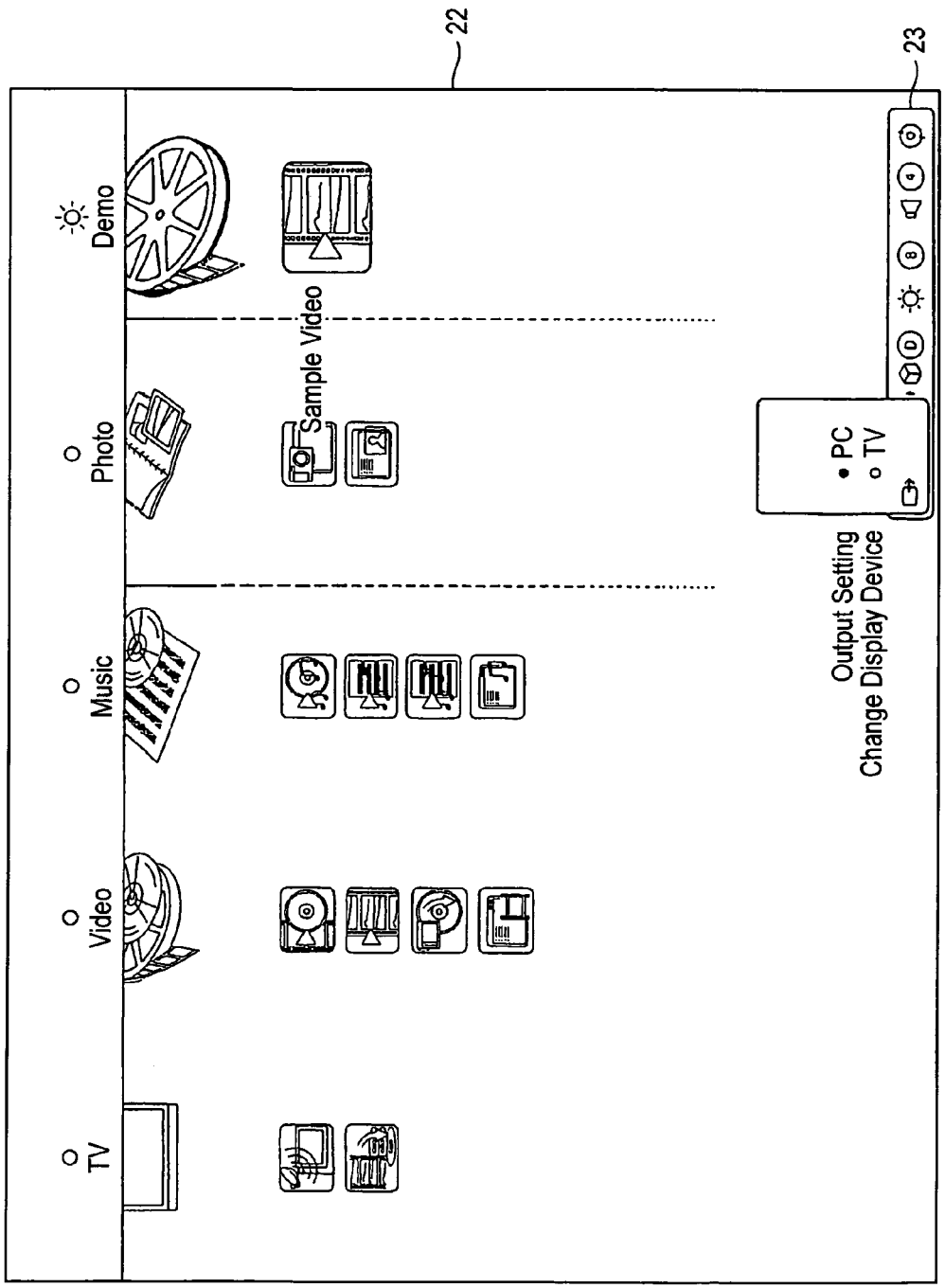
FIG. 15 is a view showing an example of display of the control panel according to the embodiment.

When the display process for displaying the launcher screen 22 is terminated, a process for setting functions in the control panel 23 is next performed. In this process, the function (application) allocated to each icon placed on the launcher screen 22 is checked as to whether it has a setting operation which can be operated for setting currently or not (Steps S31, S33, ... S35 in FIG. 6). Buttons or icons (referred to as "operation portion icons") for calling operation portions of operation functions which can be operated for setting are placed on the control panel 23 (Steps S32, S34, ... S36 in FIG. 6). FIGS. 7-12 show examples of states where the operation portion icons are placed on the control panel 23. FIGS. 13-15 show configuration examples of various operation portions called by operation icons.

In such a manner, the process for displaying the launcher screen 22 and the process for setting the control panel 23 are terminated. After that, the procedure enters a routine of waiting for key-in (Step S23 in FIG. 5). Whenever the launcher screen 22 or the control panel 23 is operated using an operation unit such as an arrow key or a mouse cursor, processing is executed in accordance with the operation (Steps S24-S28 and S21-S23 in FIG. 5). In this event, the CPU 101 always recognizes, of the icons displayed on the launcher screen 22, the third-size icon as an active icon. For example, when the "Enter" key on the keyboard unit 112 is operated (Step S24 in FIG. 5), a process of a function (application) allocated to the active icon is executed immediately (Step S25 in FIG. 5). In addition, the CPU 101 always recognizes, of the icons displayed on the launcher screen 22, the second-size icons as active icon candidates. For example, when the "up" cursor key (arrow key indicating the up direction) Ka or the "down" cursor key (arrow key indicating the down direction) Kb on the keyboard unit 112 is operated (Step S26 in FIG. 5), the active icon is moved from one icon to another among the active icon candidates in accordance with the operation (Step S27 in FIG. 5). Here, when the "up" cursor key Ka is operated, the third-size active icon is moved to an icon arrayed in the up direction in the same category as the third-size active icon. When the "down" cursor key Kb is operated, the active icon is moved to an icon arrayed in the down direction in the same category as the third-size active icon.

For example, in the launcher screen 22 shown in FIG. 7, an icon "listen to music CD" in the category "music" is a third-size active icon, and an icon "listen to music (a)", an icon "listen to music (b)" and an icon "open music folder" in the category "music" are second-size active icon candidates respectively. For example, assume that the "up" cursor key Ka provided on the keyboard unit 112 is operated when the launcher screen 22 shown in FIG. 7 is displayed. In this case, the active icon is not moved. On the other hand, when the "down" cursor key Kb is operated, the third-size active icon is moved from the icon "listen to music CD" to an icon arrayed in the down direction one by one. For example, the third-size active icon can be moved to the icon "open music folder" as shown in FIG. 8. When the "up" cursor key Ka is operated in the state where the launcher screen 22 shown in FIG. 7 is displayed, the active icon may not stay in the icon "listen to music CD" but move to the icon "open music folder" at the bottom of the same category as the active icon as shown in FIG. 8.

For example, assume that the "right" cursor key Kd provided on the keyboard unit 112 is operated when the launcher screen 22 shown in FIG. 7 is displayed (Step S28 in FIG. 5). In this case, the active category is moved to the category "photo" located in the right direction of the screen (Step S29 in FIG. 5) as shown in FIG. 9. In this event, the category to be focused is changed over from the category "music" to the category "photo". When the category "photo" is made active, the size of each icon belonging to the active category "photo" is changed into the second size one size larger than the basic size (Step S21 in FIG. 5). The size of a predetermined default icon is changed to the third size further one size larger than the second size (Step S22 in FIG. 5). A difference in luminance is provided for each icon in accordance with the size of the icon in the same manner as in the aforementioned default screen.

Figure 10:
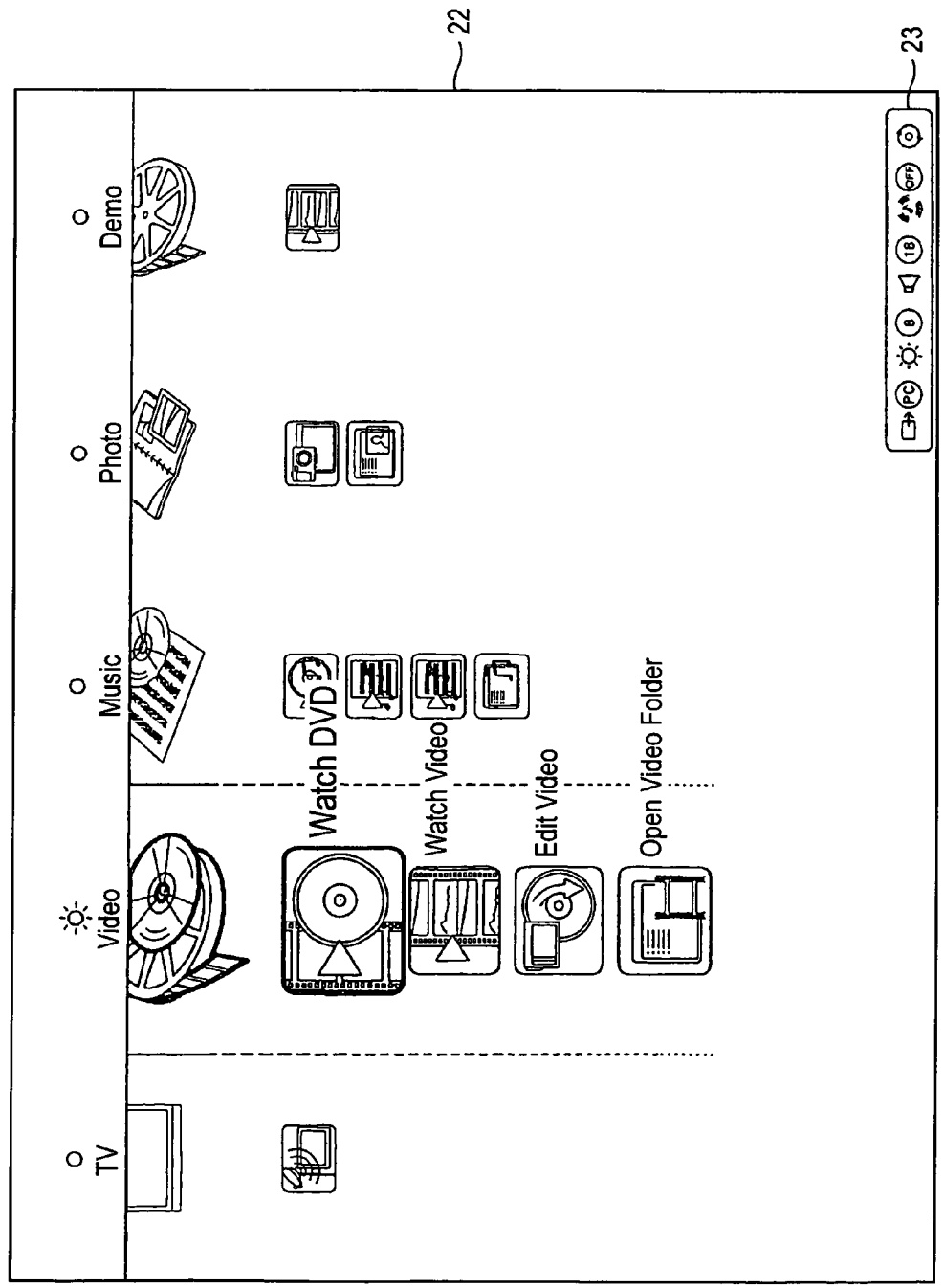
FIG. 10 is a view showing an example of display of the operation screen according to the embodiment.

For example, assume that the "left" cursor key Kc provided on the keyboard unit 112 is operated when the launcher screen 22 shown in FIG. 7 is displayed (Step S28 in FIG. 5). In this case, the active category is moved to the category "video" located in the left direction of the screen (Step S29 in FIG. 5) as shown in FIG. 10. In this event, the category to be focused is changed over from the category "music" to the category "video". When the active category is moved thus, a process for changing the active icon and the active icon candidates (Steps S21 and S22 in FIG. 5) is executed. For example, when the "Enter" key on the keyboard unit 112 is operated (Step S24 in FIG. 5) in the state of the launcher screen 22 shown in FIG. 10 where the category "video" is active, a DVD playback function allocated to an icon "watch DVD" is executed immediately (Step S25 in FIG. 5). For example, when the "down" cursor key Kb provided on the keyboard unit 112 is operated (Step S26 in FIG. 5) in the display state of the launcher screen 22 shown in FIG. 10, the third-size active icon is moved from the icon "watch DVD" to an icon "watch video" (Step S27 in FIG. 5) as shown in FIG. 11. For example, when the "left" cursor key Kc provided on the keyboard unit 112 is operated (Step S28 in FIG. 5) in the display state of the launcher screen 22 shown in FIG. 10, the active category is moved to the category "TV" located in the left direction of the screen (Step S29 in FIG. 5) as shown in FIG. 12. When there is a key-in operation unconcerned in the processing of the launcher function (Step S30 in FIG. 5) in the display state of the launcher screen 22, the procedure gives way to a process in accordance with a command specified by the key-in operation.

For example, when an operation portion icon on the control panel 23 is selected by the mouse cursor in each of the aforementioned states of the launcher screen 22, an operation portion allocated to the icon is displayed. Various settings about the function selected on the launcher screen 22 can be set simultaneously on the same screen by operating the operation portion. For example, the brightness of the screen can be set desirably by a luminance setting operation portion while the category "photo" is made active as shown in FIG. 13. The volume can be set desirably by a volume setting operation portion when the category "music" is made active as shown in FIG. 14. Display output setting for changing over the device where a display output should be supplied, from the display device 106 to a television receiver connected through the video output terminal (composite signal output terminal) 105, can be made while the category "TV", "video", "photo" or the like is made active as shown in FIG. 15.

Incidentally, the operation of the launcher screen 22 is not limited to operation using the arrow keys, the "Enter" key, etc. provided on the keyboard unit 112. The launcher screen 22 can be operated likewise by mouse cursor operation using the pointing device 14, operation using the "Enter" button 211 and the direction indication buttons 221-224 in the remote controller 200, or the like.

According to the aforementioned embodiment of the invention, it is possible to implement a launcher function showing sufficient visual effect such that a user can select any desired function easily with a simple operation.

The invention is not limited to the embodiment. In an execution phase, constituent parts can be modified to give a shape to the invention without departing from the scope and sprit thereof. For example, the configuration of the launcher screen, the configuration of the information processing apparatus, the configuration of the launcher program (LP), etc. are not limited to those shown in the embodiment. For example, those configurations can be changed desirably in accordance with a use mode, equipment to which the launcher function is applied, or the like.

In the embodiment, the graphics controller 104 serves as a control unit that displays an operation screen on a display, the operation screen having a plurality of icons arrayed by category. The keyboard unit 112 and the remote controller 200 serves as an operation unit for operating the operation screen. The CPU 101 and the graphics controller 104 serves as an icon management unit that, when one of the icons displayed on the operation screen is pre-selected in response to an operation of the operation unit, changes size of the pre-selected icon into a first enlarged size, and changes size of any other icon in the category to which the pre-selected icon belongs into a second enlarged size that is smaller than the first enlarged size. The CPU 101 serves as an execution unit that executes a function allocated to the icon of the first enlarged size when the pre-selected icon is selected in response to an operation of the operation unit. The LCD 106 serves as the display unit.

In the embodiment described above, when one of the icons are pre-selected, the icons that belong to the category in which the pre-selected icon belongs are displayed in the enlarged state. However, the icons that belong to the category in which the pre-selected icon belongs may be displayed in a state other than the enlarged state, the state that is distinguishable from other icons that belong to a different category.

The invention is not absolutely limited to the embodiment. In an execution phase, constituent parts can be modified to give a shape to the invention without departing the scope and sprit thereof. In addition, various inventions can be formed by suitable combinations of a plurality of constituent parts disclosed in the aforementioned embodiment. For example, some constituent parts may be deleted from the whole constituent parts disclosed in the embodiment. Further, constituent parts in different embodiments may be combined suitably.

What is claimed is:

1. An information processing apparatus comprising a computer readable medium and a processor configured to execute computer instructions stored on the computer readable medium to perform the following steps:

displaying an operation screen on a display unit, the operation screen having a plurality of icons arrayed by category, each category being represented by a category image, wherein the plurality of icons are displayed in three icon sizes: a normal size, a first enlarged size, and a second enlarged size;

receiving a selection of one of the icons displayed on the operation screen;

displaying the selected icon in the first enlarged size;

displaying any other icons in the category to which the selected icon belongs in the second enlarged size; and displaying other icons not in the same category as that of the selected icon in the normal size.

2. The information processing apparatus as claimed in claim 1, the steps further comprising:

changing size of the pre-selected icon into the first enlarged size when one of the icons displayed on a operation screen is pre-selected in response to an operation of the operation unit; and changing size of any other icon in the category to which the pre-selected icon belongs into a second enlarged size that is smaller than the first enlarged size.

3. The information processing apparatus as claimed in claim 2, the steps further comprising:

changing the size of the icon of the first enlarged size into the second enlarged size while the size of the pre-selected icon is changed into the first enlarged size when one of the icons of the second enlarged size is pre-selected in response to the operation of the operation unit.

4. The information processing apparatus as claimed in claim 1, wherein the icons displayed on the operation screen are icons allocated to currently executable functions respectively.

5. The information processing apparatus as claimed in claim 1, the steps further comprising:

displaying the category to which the pre-selected icon belongs with higher luminance than any other category by an icon management unit.

6. The information processing apparatus as claimed in claim 5, the steps further comprising:

displaying the icons with different luminance in accordance with the size of each of the icons by the icon management unit.

7. The information processing apparatus as claimed in claim 1, the steps further comprising:

displaying a control panel for controlling functions allocated to the icons together with the operation screen by a control unit.

8. The information processing apparatus as claimed in claim 7, wherein the control unit selectively displays on the control panel operation portions that are currently configurable.

9. A method for controlling an operation screen in which a plurality of icons are arrayed, the method comprising:
arranging a plurality of icons in an array on an operation screen by category, each category being represented by a category image, wherein the icons are displayed in three icon sizes: a normal size, a first enlarged size, and a second enlarged size;
enlarging, in response to an operation for pre-selecting one of the icons arrayed on the operation screen, the pre-selected icon to the first enlarged size, while displaying any other icon in the category to which the pre-selected icon belongs in the second enlarged size, and setting the icon enlarged to the first enlarged size to an active state; and
displaying other icons not in the same category as that of the selected icon in the normal size.

10. The method as claimed in claim 9, wherein when enlarging the pre-selected icon to the first enlarged size, any other icon in the category to which the pre-selected icon belongs is enlarged to a second enlarged size that is smaller than the first enlarged size.

11. The method as claimed in claim 10, further comprising changing, in response to the operation for pre-selecting one of the icons of the second enlarged size, an icon of the first enlarged size into the second enlarged size, and changing the pre-selected icon into the first enlarged size.

12. The method as claimed in claim 9, wherein the icons displayed on the operation screen are icons allocated to currently executable functions.

13. The method as claimed in claim 9, further comprising displaying an icon array portion of the category to which the pre-selected icon belongs with higher luminance than any other category.

14. The method as claimed in claim 9, further comprising displaying the icons with different luminance in accordance with the size of each of the icons.

15. The method as claimed in claim 9, further comprising displaying a control panel for controlling functions allocated to the icons together with the operation screen.

16. The method as claimed in claim 15, wherein the control panel is selectively displayed with operation portions that are currently configurable.

17. A software program product stored in a computer readable medium for causing a computer to execute procedures comprising:
displaying an operation screen having a plurality of icons arrayed by category, each category being represented by a category image, wherein the icons are displayed in three icon sizes: a normal size, a first enlarged size, and a second enlarged size;
enlarging, in response to an operation for pre-selecting one of the icons arrayed on the operation screen, the pre-selected icon to the first enlarged size, while displaying any other icon in the category to which the pre-selected icon belongs in a state distinguishable from other icons that belong to a different category, and setting the icon enlarged to the first enlarged size to an active state; and
displaying other icons not in the same category as that of the selected icon in the normal size.

18. The software program product as claimed in claim 17, wherein when enlarging the pre-selected icon to the first enlarged size, any other icon in the category to which the pre-selected icon belongs is enlarged to the second enlarged size that is smaller than the first enlarged size.

19. The software program product as claimed in claim 18, further causing the computer to execute procedures comprising changing, in response to the operation for pre-selecting one of the icons of the second enlarged size, an icon of the first enlarged size into the second enlarged size, and changing the pre-selected icon into the first enlarged size.

20. The software program product as claimed in claim 17, wherein the icons displayed on the operation screen are icons allocated to currently executable functions.

21. The software program product as claimed in claim 17, further causing the computer to execute procedures comprising displaying an icon array portion of the category to which the pre-selected icon belongs with higher luminance than any other category.

22. The software program product as claimed in claim 17, further causing the computer to execute procedures comprising displaying the icons with different luminance in accordance with the size of each of the icons.

23. The software program product as claimed in claim 17, further causing the computer to execute procedures comprising displaying a control panel for controlling functions allocated to the icons together with the operation screen.

24. The software program product as claimed in claim 23, wherein the control panel is selectively displayed with operation portions that are currently configurable.

* * * * *